B. FORD.
JAR FOR SECONDARY OR STORAGE BATTERIES.
APPLICATION FILED JULY 19, 1911.
1,054,835.
Patented Mar. 4, 1913.
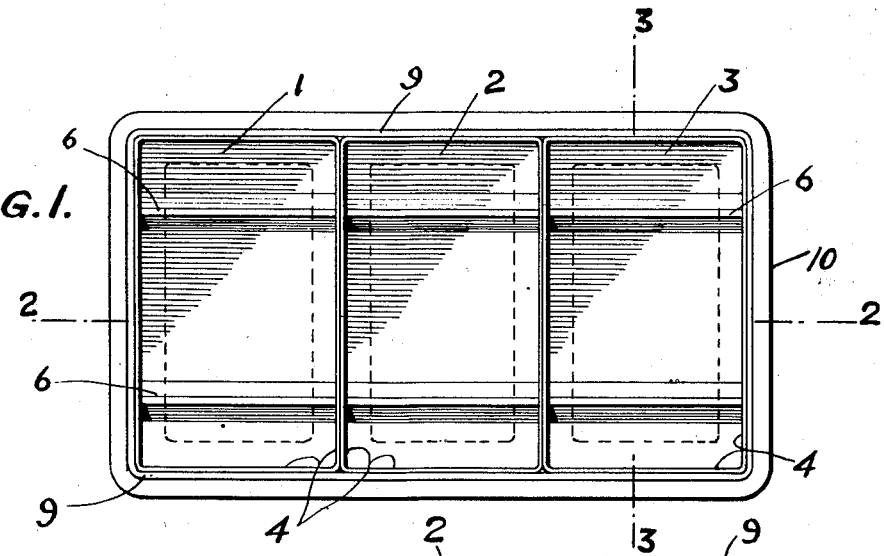
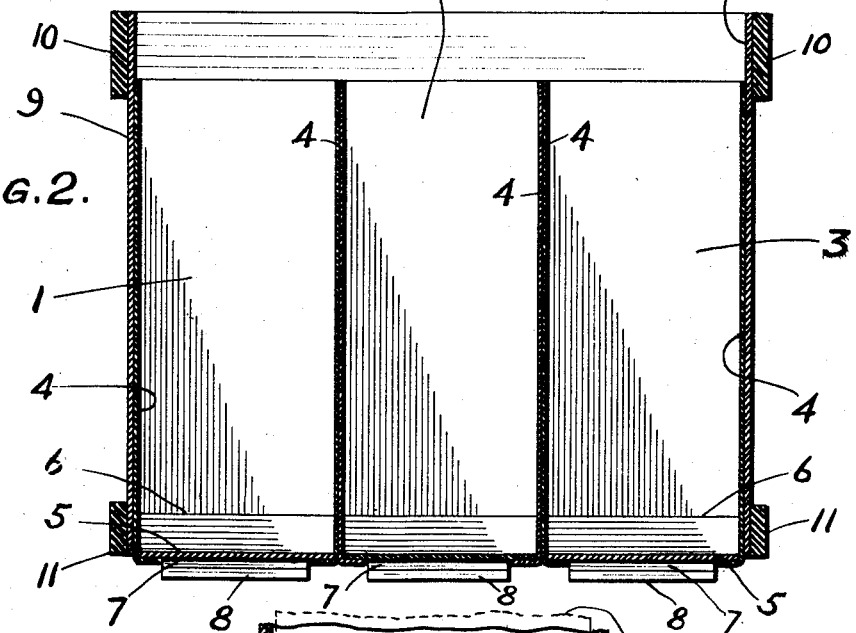
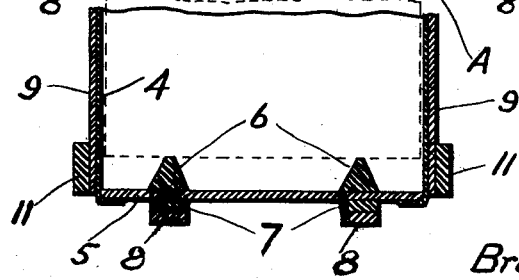
WITNESSES:
INVENTOR
Bruce Ford
BY
Augustus B. Stoughton
ATTORNEY.

UNITED STATES PATENT OFFICE.

BRUCE FORD, OF PHILADELPHIA, PENNSYLVANIA.

JAR FOR SECONDARY OR STORAGE BATTERIES.

1,054,835.  Specification of Letters Patent.  Patented Mar. 4, 1913.

Application filed July 19, 1911. Serial No. 639,278.

*To all whom it may concern:*

Be it known that I, BRUCE FORD, a citizen of the United States, residing at the city of Philadelphia, in the county of Philadelphia and State of Pennsylvania, have invented a certain new and useful Jar for Secondary or Storage Batteries, of which the following is a specification.

The principal object of the present invention is to avoid or prevent leakage between the several plate-compartments into which the jar is divided and at the same time to impart to the jar the necessary mechanical strength and rigidity without unduly increasing its weight.

To this and other ends hereinafter set forth the invention comprises the improvement to be claimed at the end hereof but to be first described in connection with the embodiment but not the only embodiment of it selected for illustration in the accompanying drawings in which—

Figure 1, is a top or plan view of a jar embodying features of the invention. Fig. 2, is a transverse sectional view taken on the line 2—2 of Fig. 1, and Fig. 3, is a sectional view taken on the line 3—3, of Fig. 1, and showing only the lower portions of the jar.

The individual jars 1, 2 and 3, are arranged side by side in a row with their abutting walls in contact. These jars 1, 2 and 3, are alike and a description of one will suffice.

4, is the side wall and it may be lapped as usual on itself along the side of the jar and on the bottom wall 5, as indicated by the dotted lines in Fig. 1. The wall 4, may be comparatively thin and light even to an extent that would make it not self-supporting for reasons that will be presently described.

6, are plate holding ribs projecting up from the bottom 5, and 7, are supporting ribs projecting downward from the bottom 5. These ribs 7, may be faced with soft rubber 8.

9, is an outer side wall which surrounds and binds together the group or row of jars 1, 2 and 3, and is lapped on itself. The outer side wall 9, is shown as extending above the top of the jars 1, 2 and 3.

10 and 11, are hoops or straps extending around or encircling the outer side wall 9, and arranged near the top and the bottom thereof. The top hoop 10, may extend below the tops of the jars 1, 2 and 3.

The described multiple plate-compartment jar, when made of hard rubber, has its parts assembled in the manner described and upon vulcanization constitutes in effect one piece.

Inasmuch as each of the jars 1, 2 and 3, is complete in itself leakage from one jar to another is avoided even though the wall of one of the jars may be imperfect.

The described arrangement by which all of the side or vertical walls are made double insures proper mechanical strength along with the hoops 10 and 11. The alined ribs 6 and 7, receive and support the weight of the plates of which a part of one A, is indicated by dotted lines in Fig. 3. The soft rubber cushions 8, tend to absorb shocks when the jar is used for an ignition battery for an automobile which is its principal intended use.

What I claim is:

1. A multiple plate-compartment jar comprising a row of individual jars having their side walls in contact, an outer side wall surrounding the row of individual jars and integral with their side walls, and hoops encircling the outer wall and arranged near the top and bottom thereof, substantially as described.

2. A multiple plate-compartment jar comprising a row of individual jars having their side walls in contact, and an outer side wall surrounding and integral with the row of jars and binding them together, substantially as described.

3. A multiple plate-compartment jar comprising a row of individual jars having their side walls in contact and each having an internal plate rib and an external cushioned supporting rib alined therewith, an outer side wall surrounding and integral with the row of jars and binding them together, and hoops encircling and binding the outer side wall, substantially as described.

4. A multiple plate-compartment jar comprising a row of individual jars having comparatively thin side walls in contact, an outer side wall surrounding and integral with the row of jars and reinforcing their walls and extending above the top thereof, and bands or straps encircling the outer wall and of which one is disposed at the top thereof and overlaps the tops of the individual jars, substantially as described.

In testimony whereof I have hereunto signed my name.

BRUCE FORD.

Witnesses:
 GEO. M. HOWARD,
 EDGAR LONGAKER.

Copies of this patent may be obtained for five cents each, by addressing the "Commissioner of Patents, Washington, D. C."